United States Patent [19]

Gang, Jr.

[11] Patent Number: 4,897,841
[45] Date of Patent: Jan. 30, 1990

[54] SYSTEM AND METHOD FOR BRIDGING LOCAL AREA NETWORKS USING CONCURRENT BROADBAND CHANNELS

[75] Inventor: Joseph M. Gang, Jr., Saratoga, Calif.

[73] Assignee: Hughes Lan Systems, Inc., Mountain View, Calif.

[21] Appl. No.: 295,896

[22] Filed: Jan. 11, 1989

[51] Int. Cl.⁴ .............................................. H04J 3/02
[52] U.S. Cl. ................................ 370/85.13; 370/85.15
[58] Field of Search ...................... 370/85, 86, 88, 89, 370/94, 95; 340/825.5, 825.51

[56] References Cited

U.S. PATENT DOCUMENTS

| | | | |
|---|---|---|---|
| 4,627,052 | 12/1986 | Hoare et al. | 370/88 |
| 4,707,827 | 11/1987 | Bione et al. | 370/85 |
| 4,797,881 | 1/1989 | Ben-Artzi | 370/88 |

Primary Examiner—Robert L. Griffin
Assistant Examiner—Wellington Chin
Attorney, Agent, or Firm—Thomas E. Schatzel

[57] ABSTRACT

Local area networks are interconnected through bridging devices by a backbone network having a plurality of broadband channels. The bridges encapsulate local area network messages within backbone network messages which are addressed to specific bridges. The bridge then selects one of the appropriate broadband channels for transmission of the backbone network message over the backbone network.

19 Claims, 2 Drawing Sheets

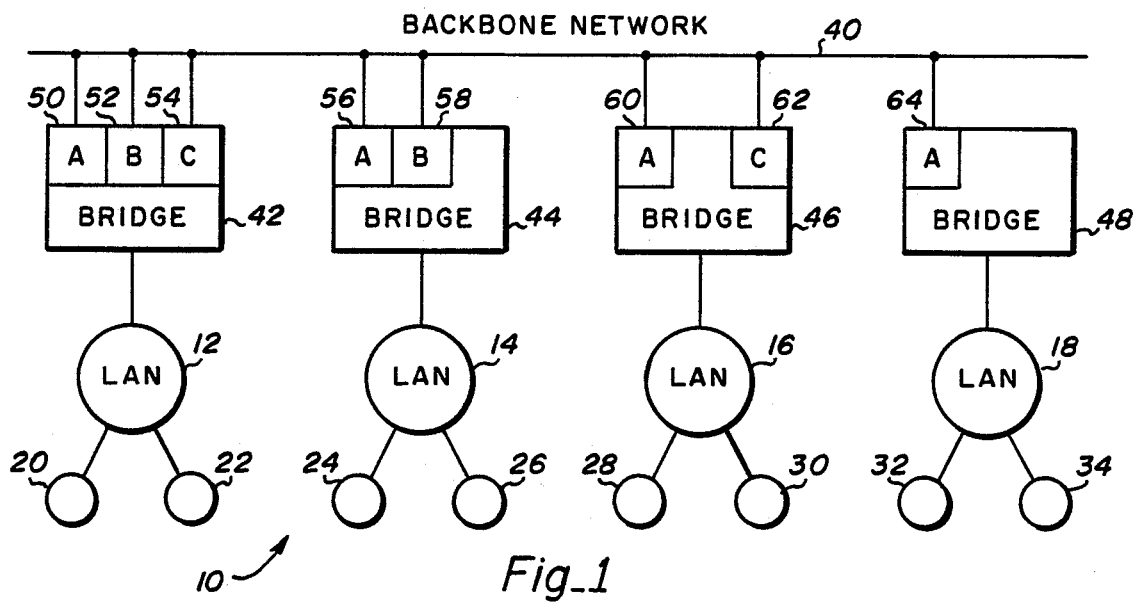
Fig_1
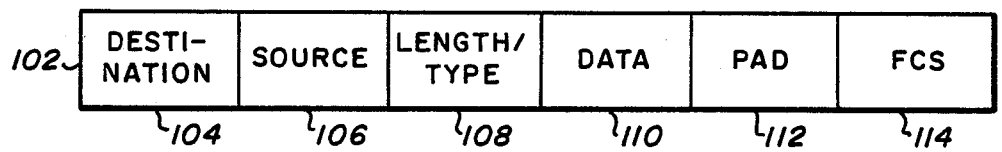
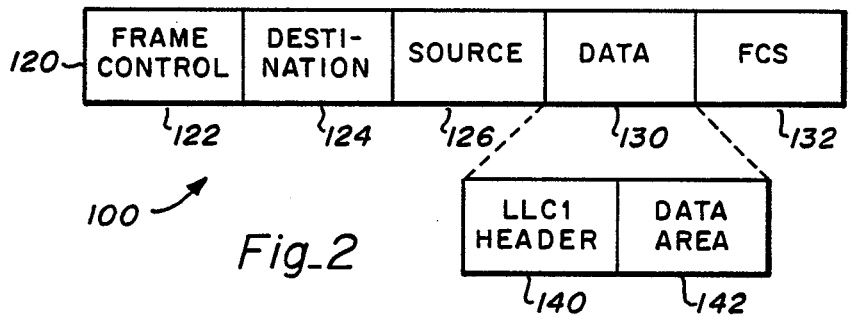
Fig_2
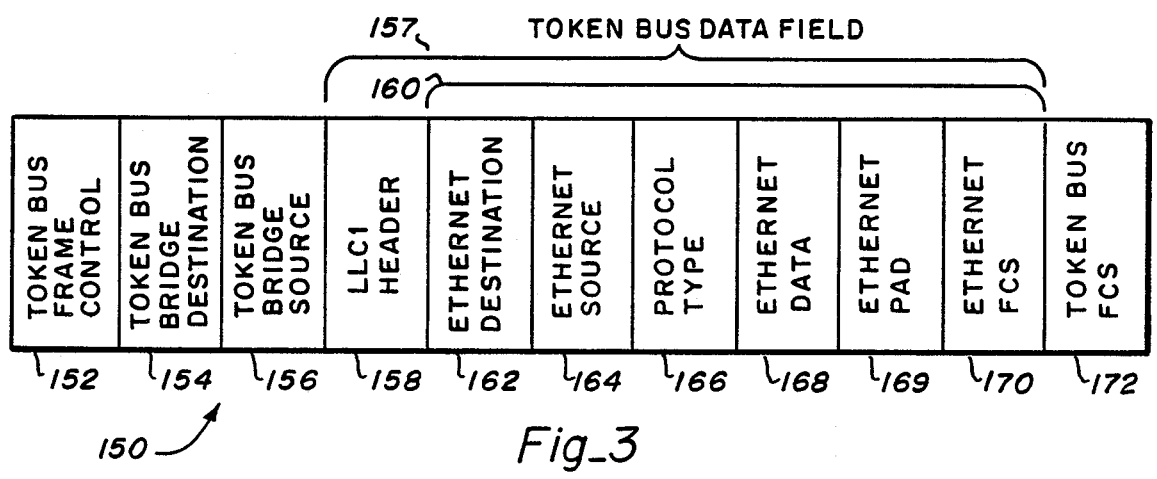
Fig_3

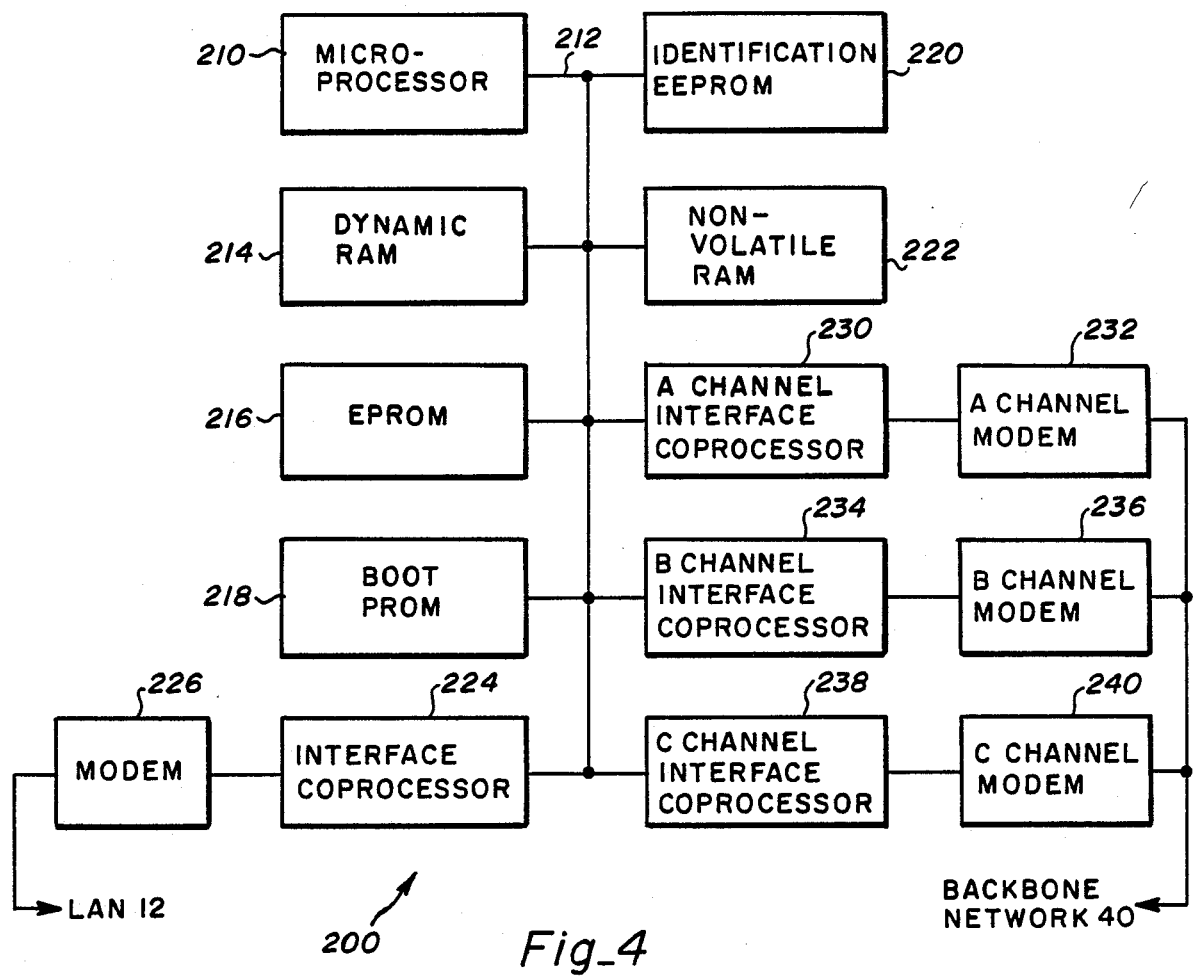
Fig_4

SYSTEM AND METHOD FOR BRIDGING LOCAL AREA NETWORKS USING CONCURRENT BROADBAND CHANNELS

BACKGROUND OF THE INVENTION

1. Field of the Invention

This invention relates generally to interconnecting local area networks and more specifically to interconnecting local area networks using concurrent broadband channels on a backbone network.

2. Description of the Prior Art

Local area networks (LANs) are stand alone networks which connect a plurality of computers and other equipment. Messages are transmitted in packets along the network. Each packet contains information identifying the source computer and the computer to which the message is intended. Each computer on the network typically has a filter which screens out messages which are not intended for it. One type of network commonly used as a local area network is the ethernet network.

Various means of interconnecting or bridging the LANs have been developed. These include U.S. Pat. No. 4,539,679, by W. Bux, et al; U.S. Pat. No. 4,706,081, by J. Hart, et al; U.S. Pat. No. 4,627,052, by D. Hoare, et al; U.S. Pat. No. 4,597,078, by M. Kempf; and U.S. Pat. No. 4,549,291, by R. Renoulin, et al.

One way to interconnect LANs involves the use of a single LAN as a backbone network in order to connect all LANs in a single system together. Messages between the LANs travel across the backbone network. This type of system is limited by the capacity of the backbone network. A need exists to increase the capacity of the backbone network in order to accommodate a greater message flow between the LANs.

SUMMARY OF THE PRESENT INVENTION

It is therefore an object of the present invention to provide a system for interconnecting LANs by means of a backbone network having increased capacity.

It is another object of the present invention to provide increased reliability by providing redundant channels between networks.

Briefly, in a preferred embodiment, the present invention comprises a token bus network which is used as a backbone network. The backbone network is divided into three broadband channels. A number of ethernet networks are each connected to the backbone network through a bridge device. Each bridge contains between one and three modems corresponding to the three backbone channels.

In operation, messages originating from one network which are intended for another network are received by the bridge. The bridge envelopes the message for transmission over the backbone network. The bridge monitors the message traffic over the broadband channels and selects the channel with the least amount of traffic. The message is then sent over the appropriate channel and the receiving bridge de-envelopes the message and transmits it to the destination ethernet network.

An advantage of the present invention is that it provides a system for interconnecting LANs using a backbone network having increased message capacity.

Another advantage of the present invention is that it provides increased reliability by providing redundant channels between networks.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a system of the present invention;

FIG. 2 is a diagram of the medium access control headers for the ethernet and token bus network;

FIG. 3 is a diagram of the backbone network packet of the present invention; and FIG. 4 is a block diagram of the bridge of the present invention.

DETAILED DESCRIPTION OF THE PRESENT INVENTION

FIG. 1 shows a block diagram of one embodiment of the system of the present invention and is designated by the general reference number 10. System 10 comprises a plurality of ethernet local area networks 12, 14, 16 and 18. Network 12 has a plurality of stations 20 and 22. Network 14 has a plurality of stations 24 and 26. Network 16 has a plurality of stations 28 and 30. Network 18 has a plurality of stations 32 and 34. Though each network is illustrated with two stations, there may be any number of stations associated with each local area network.

A broadband token bus network 40 is used as a backbone network for system 10. A plurality of bridges 42, 44, 46 and 48 connect networks 12, 14, 16 and 18, respectively, to backbone network 40. Backbone network 40 is four hundred megahertz wide and is divided into a plurality of channels. For purposes of illustration, FIG. 1 shows network 40 having three standard channels "A", "B" and "C". Each bridge has at least one modem which corresponds to one of these channels. Bridge 42 has an "A" channel modem 50, a "B" channel modem 52 and a "C" channel modem 54. Bridge 44 has an "A" channel modem 56 and a "B" channel modem 58. Bridge 46 has an "A" channel modem 60 and a "C" channel modem 62. Bridge 48 has only a single "A" channel modem.

FIG. 2 shows a diagram of the structure of the packet headers in the medium access control protocol layer and is designated by the general reference number 100. An IEEE 802.3 reference network header 102 is shown. A destination field 104 provides information on the address to which the packet is directed. A source field 106 provides information of the party who sent the packet. A length field 108 defines the length of the packet. A data field 110 provides the high protocol layer information. A pad field 112 provides additional characters needed to achieve a minimum packet size. An FCS field 114 provides the frame check sequence. The FCS is a number which is calculated using an algorithm which uses the information in the other fields. This number is then recalculated at the destination to verify that the information in the packet is correct.

In commercial applications today, the ethernet network is commonly used. The header packet of the ethernet is the same as the IEEE 802.3 header except that the length field of the IEEE 802.3 header is deleted and the ethernet network uses field 108 to contain information on the protocol type. In this way, two different protocol systems could work on the same ethernet network.

An IEEE 802.4 reference header 120 is also shown. Token bus networks use the IEEE 802.4 standard. A frame control field 122 identifies the frame type. A destination field 124 identifies the address to which the packet is being sent. A source field 126 identifies the address of the party sending the packet. The data field 130 contains the higher protocol layer information. An FCS field 132 provides the frame check sequence. The data field 130 is further divided into a header 140 and a data area 142. Header 140 is an IEEE 802.2 LLC1 type one header which describes the data in data area 142. Data area 142 actually contains the higher protocol layer information.

It is apparent that translation is required between the ethernet header 102 and the token bus header 120. Some fields must be eliminated and others added. Due to this fact, the FCS number must be recalculated based on the new frame. If an error was made in translating some of the data, the new FCS number would be calculated using the erroneous data. When the packet reaches the final destination and the FCS is checked, the error in translation would not be detected.

FIG. 3 shows a diagram of the IEEE 802.4 header as used in the present invention and is designated by the general reference number 150. The IEEE 802.4 reference is used in the token bus networks. The present invention avoids the problems of translating the ethernet header by enveloping the entire ethernet header inside the 802.4 data field. Header 150 contains a frame control field 152. A bridge destination field 154 designates the particular bridge address to which the message is addressed. A bridge source field 156 designates the bridge from which the packet originated. A field 157 comprises the data field 130 from the token bus 120. A header field 158 contains the header 140 from the token bus frame 120. Field 160 comprises the data area 142 of the token bus frame 120 and comprises the entire ethernet frame 102 including an ethernet destination field 162, an ethernet source field 164, a protocol type field 166, an ethernet data field 168, an ethernet pad field 169 and an ethernet FCS field 170. An 802.4 FCS field 172 follows the data field 157.

Returning now to FIG. 1, when system 10 is first put into operation, each bridge constructs a bridge table which identifies each bridge with the channel(s) over which it can be reached. Each bridge sends out a message over each of its channels asking for a response. The other bridges answer over their channels and the first bridge stores the information associating each bridge and its channels in a bridge table.

After the bridge table is constructed, each bridge starts to construct a station address table. For example, suppose station 20 puts out a packet on network 12 for station 22. Bridge 42 would receive the message and look at the ethernet source field (106 in FIG. 2). Bridge 42 would then store station 20 with a number, 12 for example, which would designate station 20 as being in network 12. At this point, bridge 42 would not have an address for station 22 stored. So, bridge 42 would envelope the ethernet header inside the token bus header as shown in FIG. 3. The bridge of destination is unknown to bridge 42 and the bridge destination field 154 in FIG. 3 would have a multicast address to all other bridges, 44, 46 and 48, in this case. The bridge source field 156 would contain the address of bridge 42 on the backbone network 40. The FCS field 172 would then be calculated using the entire token bus header 150. This multicast message would then be transmitted over all three channels of backbone network 40.

Bridge 44 would receive the token bus frame from bridge 42 over the token bus backbone network 40. Bridge 44 would note the bridge source field 156 and the ethernet source field 164 of the packet. Bridge 44 would store information associating station 20 with bridge 42. Next, bridge 44 will de-envelope the ethernet frame by removing the field 160 from the token bus frame 150. The ethernet message is then placed on network 14. Since the ethernet address is for station 22, all stations on network 14 would disregard the message. The same procedure would occur in bridges 46 and 48 because they would also receive the multicast message.

After an initial start up period, each of bridges 42, 44, 46 and 48 will have stored information which associates every station with its particular bridge. Now when bridge 42 receives a message on network 12 from station 20 to station 22, bridge 42 would ignore the message. If station 20 sends a message for station 28, then bridge 42 would envelope the message and address it only to bridge 46. Bridge 42 would then consult the bridge address table to determine that bridge 46 can be reached by either channel "A" or "C". Bridge 42 would then select the appropriate channel using a channel selection method which is explained in more detail below. In this case, suppose channel "A" is chosen. Bridge 46 would receive the packet on channel "A" and de-envelope the packet and send it over network 16 to station 28. Bridge 44 and 48 would ignore the message because it is not addressed to them and networks 14 and 18 would not be disturbed.

The channel selection method can be implemented in a number of different ways. In the preferred embodiment, the method would select the channel based upon the average token rotation time. In the token bus backbone network 40, a token is passed from bridge-to-bridge. Only the bridge with the token is allowed to transmit messages. The token rotation time, i.e., the amount of time it takes the token to return to the same bridge, depends upon the number of bridges and the number of messages which each bridge has to send. Therefore, the token rotation time is a good measure of the traffic load of each channel. Each bridge constantly calculates an average token rotation time for each channel. When a message may be transmitted by more than one channel, the bridge selects the channel with the smallest average token rotation time. This insures an equal distribution of messages across all the channels and optimizes the total message capacity of the backbone network 40 and system 10.

Another embodiment of the channel selection method might determine traffic load directly. For example, each bridge might periodically sample the number of packets going over each channel in a given time frame. The bridge would then select the channel with the least amount of traffic.

Still other embodiments of the channel selection method are possible. The method might monitor the number of messages cued in the bridge for each channel. The next message would then be added to the channel with the shortest list. The bridge could even select the channel based upon a round robin approach by assigning the packet to the channel that has not been used as recently as the others. Even a random selection of channels may be used as the method.

All of the channel selection methods thus far discussed have as their purpose to increase the overall capacity of the system. However, the channel selection method could also be set up to prioritize messages. For example, certain messages between predetermined stations or bridges may be considered high priority and it may be desirable to transmit these messages faster than others. One of the channels could be specifically dedicated as a priority channel. The channel selection method would look at the message origin and destination addresses and assign the priority channel if the correct combination was shown. In this way, high priority traffic would always get through faster.

FIG. 4 shows a block diagram of the bridges 42, 44, 46, 48 and is designated by the general reference number 200. Bridge 200 has a microprocessor 210 which is connected to a bus 212. The microprocessor 210 is an Intel 80186 or equivalent. A dynamic RAM 214, an EPROM 216, a boot PROM 218, an identification EEPROM 220 and a non-volatile RAM 222 are all connected to bus 212. An interface coprocessor 224 and modem 226 are connected between an ethernet network, e.g. 12, 14, 16 or 18 and bus 212. Coprocessor 224 is an Intel 82586 microprocessor or equivalent. An "A" channel interface coprocessor 230 is connected to bus 212. An "A" channel modem 232 is connected between coprocessor 230 and a token bus network. A "B" channel interface coprocessor 234 and a "B" channel modem 236 are connected between bus 212 and the token bus network. A "C" channel interface coprocessor 238 and a "C" channel modem 240 are connected between bus 212 and the token bus network. Coprocessors 230, 234 and 238 are Motorola 68824 microprocessors or equivalent. Modems 232, 236 and 240 are dual binary AMPSK modems, conforming to the IEEE 802.4 standard, each assigned to one of the three standard channel frequency bands.

The boot PROM 218 is used to run test programs on the bridge components when the system is first turned on. This is much the same as in a personal computer boot PROM. When a message packet arrives from the ethernet network, e.g. network 12, the interface coprocessor 224 determines if it is a valid message. If it is a valid message, then the message is stored in the dynamic RAM 214 and the microprocessor 210 is interrupted. The microprocessor 210 uses the software in the EPROM 216 to evaluate the message and if needed, select a proper channel and envelope the message for transmission to the appropriate interface coprocessor. The software in the EPROM 216 instructs the microprocessor 210 to store the bridge address and station address tables in the dynamic RAM 214 and the nonvolatile RAM 222. If the bridge 200 experiences a power outage, then on power up, the bridge 200 will still have addresses in the nonvolatile RAM 222 and there is no need to relearn all the addresses.

The identification EEPROM 220 contains a code address which is unique to each particular bridge. On power up, this bridge address is stored in the interface coprocessor 230, 234 and 238. When a packet is received from the token bus backbone network 40, the interface coprocessor verifies the code address. If the message has a bridge destination different from that in the identification EEPROM 220 or a multicast address, the message is ignored. If the bridge destination is the same as this particular bridge or its multicast address, the coprocessor stores the message in dynamic RAM 214 and interrupts the microprocessor 210. The microprocessor 210 then uses software in EPROM 216 to de-envelope the message and output it on the ethernet network. The multicast address is also stored in the EPROM 216.

The present invention thus provides an effective way to increase the capacity of the backbone network 40. The typical token bus backbone network has a maximum capacity of ten megabits per second. By creating three channels on the backbone network, the present invention has tripled the traffic capacity to thirty megabits per second.

Other embodiments of the present invention are possible. Other types of networks could be substituted for the ethernet and token bus networks of the presently preferred embodiment. For example, a fiber optic ring could be used as the backbone network.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A system for bridging local area networks comprising:
    a plurality of local area networks, each comprising at least one station;
    a backbone network divided into a plurality of broadband channels; and
    a plurality of bridges, each bridge connected between one of the local area networks and the backbone network, each bridge comprising, a network interface means connected to one of the local area networks for transmitting and receiving messages to and from the local area network to which the network interface means is connected, a plurality of backbone network interface means connected to the backbone network, each of said plurality of backbone network interface means for transmitting and receiving messages to and from said backbone network over an assigned channel, said assigned channel being one of said plurality of broadband channels, a memory means connected to the interface means and the plurality of backbone network interface means, for storing a bridge identification address, a table of addresses, and for temporarily storing said messages, and a logic means connected to the network interface means, the plurality of backbone network interface means, and the memory means, for transferring messages between the network interface means and one of the backbone network interface means and for selecting one of said plurality of broadband channels over which to send said messages.

2. The system of claim 1 wherein,
    said table of addresses associates each of said stations with its respective bridge and associates each bridge with its assigned channels.

3. The system of claim 1 wherein,
    said logic means further includes means for comparing a message originating with the local area network to which the network interface means of that bridge is connected with said table of addresses and if said message is addressed to one of said stations in a second local area network of the plurality of local area networks, said second local network is not connected to the network interface means of that bridge, then encapsulating said message in a message addressed to a second bridge which is associated with said second local area network.

4. The system of claim 1 wherein,
said logic means includes means for selecting one of said plurality of broadband channels by monitoring the message traffic over each of said plurality of broadband channels and selecting the channel with the least amount of message traffic.

5. The system of claim 1 wherein,
said logic means includes means for selecting one of said plurality of broadband channels by comparing an address of a local area network message with said table of addresses and if said address is associated with one of said plurality of broadband channels which has been designated as a priority channel, then selecting said priority channel.

6. A system for bridging local area networks comprising:
a plurality of local area networks, each comprising at least one station;
a backbone network divided into a plurality of broadband channels;
a plurality of bridge means, each connected between the backbone network and one of the local area networks, for allowing messages from a station in one local area network to be transmitted to one or more stations in one or more of the other local area networks, each of said bridge means comprising, a network interface means for transmitting and receiving local area network messages to and from said local area network, a plurality of backbone network interface means for transmitting and receiving backbone network messages to and from said backbone network, each of said plurality of backbone network interface means associated with one of said plurality of broadband channels, address table means for associating each station with a bridge means and for associating each bridge means with at least one of said broadband channels, encapsulation means for encapsulating a local area network message within a backbone network message for transmission over said backbone network as a backbone network message; and
channel selector means for selecting one of said plurality of broadband channels for transmission of a backbone network message.

7. The system of claim 6 wherein,
said bridge means further includes learning means for constructing said table of addresses.

8. The system of claim 6 wherein,
said channel selector means has means for selecting one of said plurality of broadband channels by monitoring the message traffic on said plurality of broadband channels and selecting the channel with the least amount of traffic.

9. The system of claim 6 wherein,
said address table means further comprises means for associating certain station addresses with certain of said broadband channels; and
said channel selector means has means for selecting one of said plurality of broadband channels by comparing a station address within a message with said address table and selecting one of said broadband channels with which said station address is associated.

10. A method for bridging local area networks comprising the steps of:
connecting a plurality of local area networks to a plurality of bridges, with each local area network connected to one bridge, and each bridge having at least one station;
connecting each of said plurality of bridges to a backbone network, said backbone network divided into a plurality of broadband channels;
determining the location of each station relative to its associated bridge;
determining the broadband channels on the backbone network with which each bridge may communicate;
reading the address of a local area network message on the local area network connected to a bridge and if said local area network message is addressed to a destination station within said local area network, then disregarding said message, and if said local area network message is addressed to a destination station in a second local area network of the plurality of local area networks, then encapsulating said local area network message within a backbone network message addressed to a destination bridge which is associated with said destination station; and
selecting one of said broadband channels which is associated with said destination bridge for transmission of said backbone network message containing the encapsulated local area network message over said backbone network.

11. The method of claim 10 wherein,
the step of selecting one of said broadband channels includes monitoring the message traffic on each of said plurality of broadband channels and selecting the broadband channel having the least message traffic.

12. The method of claim 10 wherein,
the step of selecting one of said broadband channels includes associating certain station combinations of the stations connected to said bridges with one of said channels, reading the addresses of local area network messages to determine an origin station and a destination station and if said origin station and destination station represent a station combination, then selecting the channel with which said station combination is associated.

13. A bridge for interconnecting local area networks comprising:
a network interface means for connection to a local area network for transmitting and receiving messages to and from said local area network;
a plurality of backbone network interface means for connection to a backbone network, each of said plurality of backbone network interface means for transmitting and receiving messages to and from said backbone network over an assigned channel, said assigned channel being one of a plurality of broadband channels;
a memory means connected to the network interface means and the plurality of backbone network interface means, for storing a bridge identification address, a table of addresses, and for temporarily storing said messages; and
a logic means connected to the network interface means, and plurality of backbone network interface means and the memory means for transferring messages between the network interface means and the plurality of backbone interface means and for selecting one of said plurality of broadband channels over which to send said message.

14. The system of claim 13 wherein,
said table of addresses associates a plurality of station addresses with a plurality of bridge addresses and associates each of said plurality of bridge addresses with at least one of said plurality of broadband channels.

15. The system of claim 13 wherein,
said logic means further includes means for comparing a message originating with the local area network to which the network interface means of that bridge is connected with said table of addresses and if said message is addressed to a station in a second local area network which is not connected to the network interface means of that bridge, then encapsulating said message in a message addressed to a second bridge which is associated with said second local area network.

16. The system of claim 13 wherein,
said logic means includes means for selecting one of said plurality of broadband channels by monitoring the message traffic over each of said plurality of broadband channels and selecting the channel with the least amount of message traffic.

17. The system of claim 13 wherein,
said logic means includes means for selecting one of said plurality of broadband channels by comparing an address of a local area network message with said table of addresses and if said address is associated with a one of said plurality of broadband channels which has been designated as a priority channel, then selecting said priority channel.

18. The system of claim 13 wherein,
said backbone network is a token-bus network; and
said logic means includes means for selecting one of said plurality of broadband channels by calculating the average token rotation time for each of said broadband channels and selecting the broadband channel with the smallest average token rotation time.

19. The system of claim 13 wherein,
said logic means includes means for selecting one of said plurality of broadband channels by periodically sampling the number of messages sent over each backbone channel in a given time frame and selecting the channel with the least amount of messages sent during that time frame.

* * * * *